United States Patent [19]

Rifi

[11] Patent Number: 4,851,499

[45] Date of Patent: Jul. 25, 1989

[54] PROCESS FOR REDUCING ODOR IN ISOTACTIC POLYPROPYLENE

[75] Inventor: Mahmoud R. Rifi, Kendall Park, N.J.

[73] Assignee: Union Carbide Corporation, Danbury, Conn.

[21] Appl. No.: 102,364

[22] Filed: Sep. 29, 1987

[51] Int. Cl.$^4$ .......................... C08F 6/00; C08F 10/06
[52] U.S. Cl. .................................... 528/494; 528/491; 528/495; 528/503; 524/315; 524/317; 524/378; 524/379; 524/388
[58] Field of Search ............... 528/491, 494, 495, 503; 524/583, 315, 317, 378, 379, 388

[56] References Cited

U.S. PATENT DOCUMENTS

| | | | |
|---|---|---|---|
| 3,255,166 | 6/1966 | Bernhardt et al. | 528/495 X |
| 3,773,743 | 11/1973 | Ainsworth, Jr. et al. | 528/495 X |
| 4,051,313 | 9/1977 | Luciani et al. | 528/495 X |
| 4,104,247 | 8/1978 | Kato et al. | 528/491 X |
| 4,331,791 | 5/1982 | Rohlfing et al. | 528/494 X |

OTHER PUBLICATIONS

Translation of Japanese Patent Application No. 58-146694 to Nakamura et al., Laid-Open Feb. 28, 1985.

Primary Examiner—Joseph L. Schofer
Assistant Examiner—F. M. Teskin
Attorney, Agent, or Firm—Saul R. Bresch

[57] ABSTRACT

A process for reducing the odor of isotactic polypropylene containing an odor producing unsubstituted or substituted benzoic acid ester by admixing molten isotactic polypropylene with a compound capable of undergoing transesterification with the odor producing ester, said transesterification compound being (i) a partially esterified glycerol; (ii) an expoxide; (iii) a monofunctional or polyfunctional alcohol; (iv) an aliphatic acid ester; or (v) mixtures thereof wherein the transesterification compound is of such functionality and/or of sufficient molecular weight to yield an ester of a molecular weight of at least about 300 upon undergoing ester interchange with said odor causing benzoic acid ester.

13 Claims, No Drawings

PROCESS FOR REDUCING ODOR IN ISOTACTIC POLYPROPYLENE

TECHNICAL FIELD

This invention relates to a process for the reduction of odor in isotactic polypropylene.

BACKGROUND ART

The consumption of isotactic polypropylene approached six billion pounds in 1986. For many years, this important industrial product was produced using catalysts based on titanium trichloride. While such catalysts produced polypropylene with a high degree of isotacticity, their activity was low. To improve the activity of the catalyst, aromatic esters such as ethyl benzoate and ethyl anisate were used in conjunction with the titanium catalyst. Such esters, however, impart an odor to polypropylene and limit its use in such applications as films and fibers.

DISCLOSURE OF THE INVENTION

An object of this invention, therefore, is to provide a process for reducing the odor in isotactic polypropylene.

Other objects and advantages will become apparent hereinafter.

According to the present invention, the above object is met by a process for reducing the odor of isotactic polypropylene containing an odor producing unsubstituted or substituted benzoic acid ester by admixing molten isotactic polypropylene with a compound capable of undergoing transesterification with the odor producing ester, said transesterification compound being (i) a partially esterified glycerol; (ii) an epoxide; (iii) a monofunctional or polyfunctional alcohol; (iv) an aliphatic acid ester; or (v) mixtures thereof wherein the transesterification compound is of such functionality and/or of sufficient molecular weight to yield an ester of a molecular weight of at least about 300 upon undergoing ester interchange with said odor causing benzoic acid ester.

DETAILED DESCRIPTION

The term "isotactic polypropylene" is defined to include isotactic polypropylene homopolymer, random isotactic polypropylene, and impact polypropylene. The isotactic polypropylene homopolymer is a highly crystalline form of polymer usually having a crystalline melting point of about 165° C. and a density of about 0.902. In the preparation of isotactic polypropylene homopolymer, a catalyst is commonly used which includes an electron donor, often an ester of an unsubstituted or a substituted benzoic acid having a molecular weight of generally no greater than about 250. Such an isotactic polypropylene homopolymer can be made by the process described in U.S. patent application, Ser. No. 911,763, filed on Sept. 26, 1986, which is incorporated by reference herein. The random isotactic polypropylene is prepared in the same manner as the homopolymer except that an alpha-olefin is introduced into the process. Random isotactic polypropylene is a copolymer of propylene and at least one alpha-olefin having 2 or 4 to 8 carbon atoms. The portion of the copolymer based on propylene is about 92 to 97 percent by weight and the portion of the copolymer based on alpha-olefin is about 3 to 8 percent by weight, the percentages being based on the weight of the copolymer.

The impact polypropylene can be prepared by using the same catalyst system; however, in this case, for example, a homopolymer or copolymer of polypropylene is prepared in a first reactor, and then transferred together with active or live catalyst to a second reactor where an ethylene/alpha-olefin (3 to 8 carbon atoms) copolymer is prepared and incorporated into the matrix polymer from the first reactor.

After completion of polymerization and any post-polymerization treatment, a small amount of electron donor usually remains, and this particular residual electron donor, an ester of an unsubstituted or a substituted benzoic acid, imparts an undesirable odor to the isotactic polypropylene. Analysis of the isotactic polypropylene indicates that the residual electron donor is generally present in an amount of about 50 to about 500 parts by weight per million parts by weight of polymer (ppm). Examples of such odor causing benzoic acid esters are ethyl benzoate, ethyl anisate, p-ethoxy ethyl benzoate, methyl benzoate, p-methoxy ethyl benzoate, p-ethoxy methyl benzoate, and p-amino hexyl benzoate.

Isotactic polypropylene can be subjected to any one of a number of conventional processes such as extrusion, extrusion coating, blow molding, injection molding, film blowing, and slot casting. An advantage of this invention is that the odor reducing process can be effected in tandem with these manufacturing processes. This is accomplished by processing at a temperature sufficient to melt the isotactic polypropylene, generally in the range of about 350° F. to about 550° F. The temperature is preferably in the range of about 400° F. to about 500° F. The isotactic polypropylene is then melted and a compound, which will accomplish the transesterification is added to the melt.

As noted, the transesterification compound can be (i) a partially esterified glycerol; (ii) an epoxide; (iii) a monofunctional or polyfunctional alcohol; (iv) an aliphatic acid ester; or (v) mixtures thereof wherein the functionality and/or molecular weight of the transesterification compound are such that the ester resulting from the interchange with the odor producing benzoic acid ester will have a molecular weight of at least about 300.

The useful partially esterified glycerol compounds can have about 20 to about 60 carbon atoms and preferably has about 21 to 38 carbon atoms. Examples of this ester are glycerol monostearate and glycerol distearate. Additional examples of this ester are:

$CH_3(CH_2)_n COOCH_2 CHOHCH_2OH$ wherein n = 16 to 20;

$CH_3(CH_2)_n CH_2 COOCH_2$

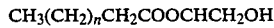
$CH_3(CH_2)_n CH_2 COOCHCH_2OH$ wherein n = 6 to 20.

The useful epoxide compounds can have one or more epoxy groups and can have about 7 to 52 carbon atoms and preferably has about 10 to 22 carbon atoms. Suitable epoxides have the general formula

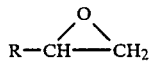

wherein R is a hydrocarbon group having 5 to 50 carbon atoms. Examples of these epoxides are 1,2-epoxy-heptane; 1,2-epoxy-octane, 1,2-epoxy-nonane, 1,2-epoxy-decane, and 1,2-epoxy-iso-octane. Other suitable epoxides are epoxidized soybean oil and cycloaliphatic epoxides such as 3-4-epoxycyclohexylmethyl-3,-4-epoxy-cyclohexane carboxylate; vinylcyclohexane dioxide; and bis(3,4-epoxycyclohexyl)adipate.

Useful alcohols can be primary, secondary, or tertiary alcohols and have from 1 to about 10 hydroxyl groups. The monofunctional alcohols can have about 12 to 50 carbon atoms, preferably about 12 to 30 carbon atoms. In the event that the alcohol is difunctional, trifunctional, or of another polyfunctionality, each functionality, i.e., hydroxyl group, is theoretically capable of reacting with one ester molecule thus achieving the molecular weight of at least about 300. In the case where more than one functionality is present, then, the number of carbon atoms in each transesterification molecule can be theoretically as low as 2 or 3. Specific examples of useful alcohols are glycerol, decanol, isodecanol, neopentyl glycol, caprolactone polyol, and pentaerythritol.

Aliphatic acid esters, which can be used in the invention, can have about 20 to about 60 carbon atoms and preferably about 21 to 38 carbon atoms. Examples of such useful aliphatic acid esters are completely esterified glycerols wherein each acid moiety has about 6 to 22 carbon atoms and esters of the formula RCOOR' wherein R is aliphatic such as alkyl or alkenyl and R' is aliphatic or aromatic. Examples of the RCOOR' esters are cetyl acetate, heptadecyl acetate, octadecyl acetate, nonadecyl propionate, and pentadecyl propionate.

It should be pointed out that the transesterifying compounds can be cyclic or acyclic, saturated or unsaturated, substituted or unsubstituted, and any combination of the foregoing so long as they are capable of transesterifying with the odor causing benzoic acid ester to provide the desired high molecular weight.

In order to increase the molecular weight of an ester of benzoic acid to at least about 300, the alcohol moiety in a transesterification compound, which is, for example, a monofunctional alcohol or an epoxide, must have a molecular weight of at least about 195. The preferred molecular weight of the alcohol moiety of useful transesterification compounds is much higher than 195, the only upper limit being the bounds of practicality.

The transesterification compound is introduced into the melt in an amount of about 100 to about 5000 ppm based on the weight of the isotactic polypropylene, and preferably in an amount of about 500 to about 2000 ppm, i.e., parts per million parts by weight of polymer. The transesterification then proceeds, the alcohol moiety of the transesterification compound interchanging with the alcohol moiety of the benzoic acid ester. Processing, e.g., extrusion, is completed, and the extruded isotactic polypropylene is brought down to ambient temperature. The polymer is then ready for further processing into fiber or other end use products.

Typical transesterification reactions carried out in accordance with this invention are as follows (MW=molecular weight):

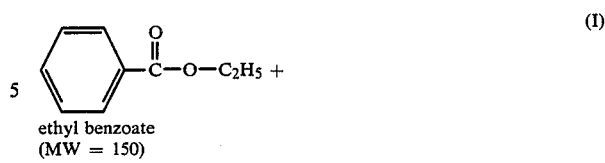
ethyl benzoate
(MW = 150)

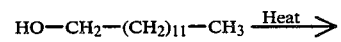

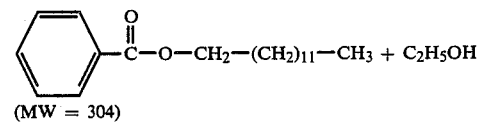
(MW = 304)

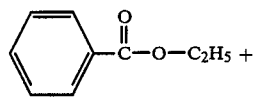

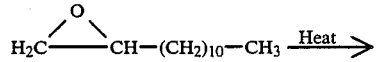

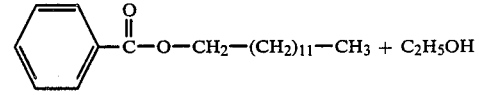

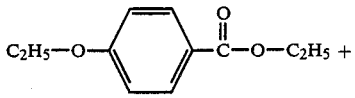

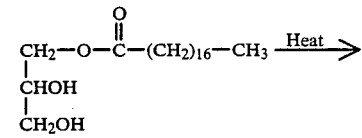

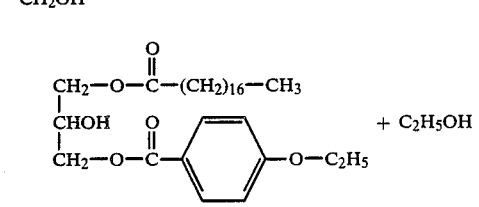

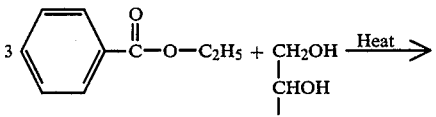

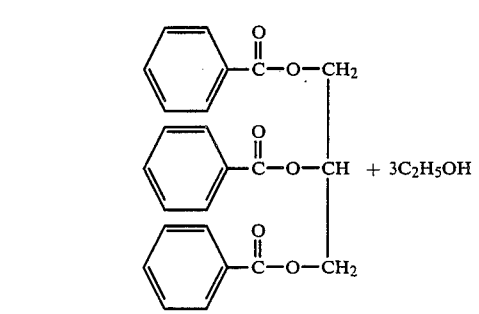

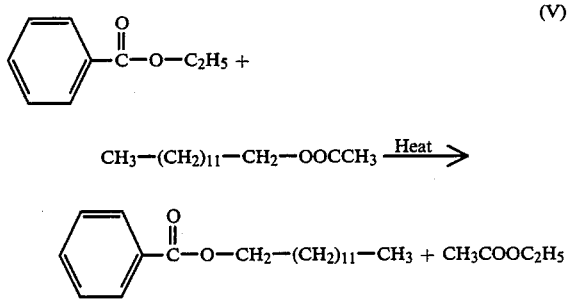

The invention is illustrated by the following example in which ppm means parts by weight per million parts by weight of isotactic polypropylene.

EXAMPLE

Granular, isotactic polypropylene homopolymer having a melt flow of 4 and xylene solubles of 3.5 is prepared from a titanium based catalyst in which ethyl anisate is used as the electron donor. Two 1000 gram samples of this polymer containing 300 ppm of residual ethyl anisate are stabilized with 1000 ppm of antioxidant and 300 ppm of zinc oxide. 1000 ppm of glycerol monostearate are added to one of the samples. Both samples are extruded at 232° C., pelletized, and tested for odor.

The odor test is conducted as follows: 300 grams of each pelletized sample are placed into separate jars, which are then closed. The closed jars are placed in a 90° C. oven for one hour. The jars are then opened, and the operator, who is familiar with the odor of ethyl anisate, uses his olfactory sense to determine whether there is an odor emanating from either jar. It is found that the sample to which glycerol monostearate is added displays little or no anisate odor, while the other sample displays a distinct anisate odor. Infrared and mass spectral analysis of the sample to which glycerol monostearate is added confirms the presence of little or no ethyl anisate in the sample.

I claim:

1. A process for reducing the odor of isotactic polypropylene containing an odor producing unsubstituted or substituted benzoic acid ester by admixing molten isotactic polypropylene with a compound capable of undergoing transesterification with the odor producing ester, said transesterification compound being (i) a partially esterified glycerol; (ii) an epoxide; (iii) a monofunctional or polyfunctional alcohol; (iv) an aliphatic acid ester; or (v) mixtures thereof wherein the transesterification compound is of such functionality and/or of sufficient molecular weight to yield an ester of a molecular weight of at least about 300 upon undergoing ester interchange with said odor producing benzoic acid ester, wherein the transesterification compound is introduced in an amount of about 100 to about 5000 parts by weight per million parts by weight of isotactic polypropylene.

2. The process defined in claim 1 wherein the transesterification compound is a monofunctional alcohol having an alcohol moiety with a molecular weight of at least about 195.

3. The process defined in claim 1 wherein the transesterification compound is a partially esterified glycerol.

4. The process defined in claim 1 wherein the transesterification compound is an epoxide.

5. The process defined in claim 3 wherein the transesterification compound is a difunctional alcohol.

6. The process defined in claim 3 wherein the polyfunctional alcohol has at least 3 hydroxyl groups.

7. The process defined in claim 1 wherein the odor producing ester is present in the isotactic polypropylene in an amount of about 50 to about 500 parts by weight per million parts by weight of isotactic polypropylene.

8. The process defined in claim 1 wherein the transesterification compound is introduced in an amount of about 500 to about 2000 parts by weight per million parts by weight of isotactic polypropylene.

9. A process for reducing the odor of isotactic polypropylene containing a first ester of an unsubstituted benzoic acid or a substituted benzoic acid having one benzene ring comprising the following steps:
(a) processing the isotactic polypropylene at a temperature sufficient to melt the isotactic polypropylene and melting same; and
(b) introducing into the melt a compound capable of transesterifying the first ester, said transesterification compound being (i) a partially esterified glycerol; (ii) an epoxide; (iii) a monofunctional or polyfunctional alcohol; (iv) a second ester in which the acid moiety is aliphatic; or (v) mixtures thereof wherein the alcohol moiety of the transesterification compound, which interchanges with the alcohol moiety of the first ester, is of sufficient molecular weight to increase the molecular weight of the first ester to at least about 300, said compound being introduced, under transesterification conditions, in an amount of about 100 to about 5000 parts by weight per million parts by weight of isotactic polypropylene.

10. The process defined in claim 13 wherein the first ester is present in the isotactic polypropylene in an amount of about 50 to about 500 parts by weight per million parts by weight of isotactic polypropylene.

11. The process defined in claim 13 wherein the transesterification compound is introduced in an amount of about 500 to about 2000 parts by weight per million parts by weight of isotactic polypropylene.

12. The process defined in claim 13 wherein the transesterification compound is a partially esterified glycerol.

13. The process defined in claim 16 wherein the transesterification compound is glycerol monostearate.

* * * * *

UNITED STATES PATENT AND TRADEMARK OFFICE
CERTIFICATE OF CORRECTION

PATENT NO. : 4,851,499

DATED : July 25, 1989

INVENTOR(S) : M.R. Rifi

It is certified that error appears in the above-identified patent and that said Letters Patent is hereby corrected as shown below:

Claims 5 and 6, column 6, lines 11 and 13, change "3" to -- 1 --.

Claims 10, 11, and 12, column 6, lines 45, 49, and 53, change "13" to -- 9 --.

Claim 13, column 6, line 56, change "16" to -- 12 --.

Signed and Sealed this

Sixth Day of November, 1990

Attest:

HARRY F. MANBECK, JR.

*Attesting Officer*  *Commissioner of Patents and Trademarks*